US012644020B2

(12) United States Patent
Kameda

(10) Patent No.: US 12,644,020 B2
(45) Date of Patent: Jun. 2, 2026

(54) METHOD FOR DISMANTLING BONDED MEMBER, BONDED MEMBER, AND EASILY DISMANTLED SILICONE-BASED LIQUID ADHESIVE

(71) Applicant: SHIN-ETSU CHEMICAL CO., LTD., Tokyo (JP)

(72) Inventor: Norio Kameda, Annaka (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 88 days.

(21) Appl. No.: 18/697,246

(22) PCT Filed: Sep. 20, 2022

(86) PCT No.: PCT/JP2022/034941

§ 371 (c)(1),
(2) Date: Mar. 29, 2024

(87) PCT Pub. No.: WO2023/054052

PCT Pub. Date: Apr. 6, 2023

(65) Prior Publication Data

US 2024/0409777 A1 Dec. 12, 2024

(30) Foreign Application Priority Data

Sep. 30, 2021 (JP) ................................ 2021-160447

(51) Int. Cl.
*C09J 5/06* (2006.01)
*C09J 11/04* (2006.01)
*C09J 183/04* (2006.01)

(52) U.S. Cl.
CPC ................. *C09J 5/06* (2013.01); *C09J 11/04* (2013.01); *C09J 183/04* (2013.01); *C09J 2301/408* (2020.08); *C09J 2301/416* (2020.08); *C09J 2301/502* (2020.08)

(58) Field of Classification Search
CPC ... C09J 5/06; C09J 11/04; C09J 183/04; C09J 2301/408; C09J 2301/416; C09J 2301/502; C09J 2203/318; C09J 2203/354; C09J 2483/00; C09J 5/00; C09J 11/06; C09J 2203/326; B29B 2017/0203; B29B 17/02; B29K 2067/006; B29K 2083/00; C08G 77/18; C08K 2003/2224; C08K 2003/2227; C08K 2003/2241; C08K 2003/2265
See application file for complete search history.

(56) References Cited

U.S. PATENT DOCUMENTS

| | | | | |
|---|---|---|---|---|
| 5,312,855 A * | 5/1994 | Okami | C09J 183/04 524/775 |
| 5,366,809 A * | 11/1994 | Schmidt | C09J 183/04 428/452 |
| 2010/0075129 A1 | 3/2010 | Nagasaki et al. | |
| 2010/0175829 A1* | 7/2010 | Masuda | C09J 5/06 156/711 |
| 2012/0329942 A1 | 12/2012 | Kohl et al. | |
| 2020/0317919 A1* | 10/2020 | Fujiwara | C09J 183/04 |
| 2021/0169552 A1 | 6/2021 | Shuman et al. | |
| 2022/0127500 A1 | 4/2022 | Ito et al. | |

FOREIGN PATENT DOCUMENTS

| | | | |
|---|---|---|---|
| JP | 2000-204332 A | 7/2000 | |
| JP | 2002-327163 A | 11/2002 | |
| JP | 2003-26784 A | 1/2003 | |
| JP | 2004-123943 A | 4/2004 | |
| JP | 2008-56843 A | 3/2008 | |
| JP | 2008-120903 A | 5/2008 | |
| JP | 2013-518950 A | 5/2013 | |
| JP | 6221630 B2 | 11/2017 | |
| JP | 2019-147874 A | 9/2019 | |
| JP | 2020-128463 A | 8/2020 | |
| JP | 2021-90750 A | 6/2021 | |
| WO | WO 00/40648 A1 | 7/2000 | |
| WO | WO-2005071035 A1 * | 6/2005 | C09J 5/06 |
| WO | WO-2019069706 A1 * | 4/2019 | C09K 3/10 |

OTHER PUBLICATIONS

International Search Report (PCT/ISA/210) issued in PCT/JP2022/034941, dated Nov. 15, 2022.
Written Opinion of the International Searching Authority (PCT/ISA/237) issued in PCT/JP2022/034941, dated Nov. 15, 2022.

* cited by examiner

*Primary Examiner* — Christopher W Raimund
(74) *Attorney, Agent, or Firm* — Birch, Stewart, Kolasch & Birch, LLP

(57) ABSTRACT

With regard to a bonded member in which a plurality of members are bonded together by a cured product obtained by curing a curable silicone-based liquid adhesive containing a hydroxide compound with a decomposition temperature of 180° C.-600° C. and a specific amount of particles which generate heat by means of microwaves, a dismantling method for the bonded member including a step in which the plurality of members are separated from each other by irradiating the cured product with microwaves and the bonded member is dismantled makes it possible to easily recycle the members.

14 Claims, No Drawings

METHOD FOR DISMANTLING BONDED MEMBER, BONDED MEMBER, AND EASILY DISMANTLED SILICONE-BASED LIQUID ADHESIVE

TECHNICAL FIELD

This invention relates to a method of dismantling a bonded assembly, using a curable liquid silicone adhesive composition which enables any operations to be easily conducted in a short time during collection, repairing and recycling of automobile components such as automobile electric parts and electric/electronic components. It also relates to a bonded assembly and a dismantlable liquid silicone adhesive composition for use in the method.

BACKGROUND ART

Nowadays, recyclability is required in a variety of fields from the aspects of environment friendliness and cost reduction. In the automobile and electric/electronic fields, it is required for recycling of bonded member assemblies to dismantle the members apart. The bonded assembly must have a positive sealing capability because it plays the important role of preventing entry of dust and moisture from the outside and protecting the inside part. Adhesive seals are most effective among sealing means and required to maintain adhesiveness under various (e.g., temperature and moisture) conditions. Normally the cured product is tightly bonded to members. It is thus laborious to remove the bonding layer.

Bonded assemblies using a curable resin composition are recycled in various ways. For example, Patent Document 1 (JP-A 2003-026784) proposes a method of recycling a bonded assembly in which members are bonded with a curable polyol-based composition, the method including heating the bonded assembly at 150-200° C. to soften or liquefy the composition and dismantling the members apart. Patent Document 2 (JP-A 2002-327163) describes a method of dismantling a bonded structure using a moisture-curable urethane prepolymer-based adhesive composition, the method including contacting a halogenated organic solvent with the bonding section to lower the adhesion strength of the bonding section, and separating or dismantling the member from the bonding section. Further, Patent Document 3 (JP-A 2008-120903) proposes a re-peelable pressure-sensitive adhesive tape using an adhesive comprising a vinyl monomer mixture composed mainly of an alkyl (meth) acrylate. The adhesive maintains a high normal adhesion strength in the bonded state, but loses the adhesion strength on heating in the step of separating and dismantling the bonding section, ensuring easy separation and dismantling. Patent Document 4 (JP 6221630) describes that an oxyalkylene polymer having a tackifier resin added thereto is reworkable, and after reworking, it is re-bondable and maintains sealing performance.

On the other hand, silicone-based adhesives and sealants have better heat resistance and weather resistance than the above-mentioned organic adhesives. They are widely used in automobile, electric/electronic and building fields. The silicone-based adhesives and sealants, however, are resistant to decomposition even by heating. There is a problem that they are difficult to repair or recycle.

A masking type silicone-based adhesive is proposed as a silicone-based adhesive which makes it easy to dismantle members from each other while providing sealing performance. Among the masking type silicone-based adhesives which are free of tackifiers, there is known a silicone-based adhesive having a release-providing agent added thereto to impart release properties relative to glass and metals. This silicone-based adhesive loses its temperature durability when heated in excess of 200° C. because the release-providing agent itself is thermally decomposed. Upon heating, the member and the silicone-based adhesive are bonded to inhibit dismantling, leading to difficulties of collection and repairing.

There is a demand for a recyclable bonded assembly and a dismantling method even in the application where silicone-based adhesives are used for adhesive bonding.

PRIOR ART DOCUMENTS

Patent Documents

Patent Document 1: JP-A 2003-026784
Patent Document 2: JP-A 2002-327163
Patent Document 3: JP-A 2008-120903
Patent Document 4: JP 6221630
Patent Document 5: JP Pat. Appln. 2021-090750

SUMMARY OF INVENTION

Technical Problem

An object of the invention, which has been made under the above-mentioned circumstances, is to provide a bonded assembly which uses a bonding layer of a silicone adhesive composition, exhibits sealing performance at room temperature (23° C. #15° C., the same holds true, hereinafter) and after exposure to a high temperature of about 150° C., and can be easily recycled in a short time and with less energy consumption; a method of dismantling the bonded assembly, and a dismantlable liquid silicone adhesive composition for use in the bonded assembly.

Solution to Problem

To attain the above object, the inventor proposed in the previous patent application, Patent Document 5 (JP Pat. Appln. 2021-090750), a bonded assembly wherein members are bonded with a curable liquid silicone adhesive composition comprising a specific proportion of aluminum hydroxide having an incipient decomposition temperature of about 160° C. A bonding layer exhibits sealing performance at room temperature and even after exposure to a high temperature of about 150° C. A method of dismantling the bonded assembly involves exposing it to a high temperature in excess of 160° C. to lower the sealing performance of the bonding layer, allowing the members to be easily separated apart. This method, however, needs substantial energy consumption because it includes the step of heating in a heating oven for a long time of several hours.

Making extensive investigations on a bonded assembly and its dismantling method which enable recycling with less energy consumption in a short time, and for the purposes of increasing the efficiency and reducing the energy consumption of collecting, repairing and recycling works of electric/electronic and other products, the inventor has found the following. To a curable liquid silicone adhesive composition for use as a bonding layer in a bonded assembly, a specific amount of particles capable of generating heat upon receipt of microwave is added and a hydroxide compound (specifically, metal hydroxide or metal oxide hydroxide) which is thermally decomposed to release water is blended. A bonded assembly (in which a plurality of, typically two, members of organic resin or metal are bonded together) is bonded through a cured product of the curable liquid silicone adhesive composition. The bonding layer (i.e., cured product of the curable liquid silicone adhesive composition) exhibits sealing performance at room temperature and even after exposure to a high temperature of about 150° C., but loses adhesiveness upon receipt of microwave. Then, by irradiating microwave to the bonding layer (i.e., cured product of the curable liquid silicone adhesive composition), the plurality of, typically two, members of organic resin or metal can be separated apart, that is, the bonded assembly can be easily dismantled in a short time with a less energy consumption. The members can be recycled. The invention is predicated on this finding.

Accordingly, the invention provides a method of dismantling a bonded assembly, a bonded assembly, and a dismantlable liquid silicone adhesive composition, as defined below.

[1]

In connection with a bonded assembly wherein a plurality of members are bonded with a cured product obtained by curing a curable liquid silicone adhesive composition comprising particles capable of generating heat upon receipt of microwave and a hydroxide compound having a decomposition temperature of 180 to 600° C., the content of the particles being 0.5 to 50% by weight, a method of dismantling the bonded assembly comprising the steps of irradiating microwave to the cured product and separating the plurality of members apart.

[2]

The method of dismantling a bonded assembly according to [1] wherein the curable liquid silicone adhesive composition is a condensation-curable liquid silicone adhesive composition or addition reaction-curable liquid silicone adhesive composition.

[3]

The method of dismantling a bonded assembly according to [1] or [2] wherein the particles capable of generating heat upon receipt of microwaves are particles of at least one compound selected from carbon, iron oxide, titanium oxide, ferrite and silicon carbide.

[4]

The method of dismantling a bonded assembly according to any one of [1] to [3] wherein the hydroxide compound having a decomposition temperature of 180 to 600° C. is at least one compound selected from aluminum hydroxide, magnesium hydroxide, and aluminum oxide hydroxide (boehmite).

[5]

The method of dismantling a bonded assembly according to any one of [1] to [4] wherein the microwave has a frequency of 300 MHz to 300 GHz.

[6]

The method of dismantling a bonded assembly according to any one of [1] to [5] wherein the content of the hydroxide compound having a decomposition temperature of 180 to 600° C. is 35 to 65% by weight of the overall curable liquid silicone adhesive composition.

[7]

The method of dismantling a bonded assembly according to any one of [1] to [6] wherein the step of dismantling the bonded assembly includes peeling the cured product of a curable liquid silicone adhesive composition from the plurality of members manually or by means of a scraper.

[8]

The method of dismantling a bonded assembly according to any one of [1] to [7] wherein the bonded assembly is an automobile component or electric/electronic component.

[9]

A bonded assembly for use in the method of dismantling a bonded assembly according to any one of [1] to [8].

[10]

A dismantlable condensation-curable liquid silicone adhesive composition for use in the method of dismantling a bonded assembly according to any one of [1] to [8], the adhesive composition comprising the following components (A) to (F):

(A) 0.5 to 50% by weight based on the overall adhesive composition of particles capable of generating heat upon receipt of microwave, (B) 35 to 65% by weight based on the overall adhesive composition of a hydroxide compound having a decomposition temperature of 180 to 600° C., (C) 100 parts by weight of a linear diorganopolysiloxane which is blocked at both ends of the molecular chain with silicon-bonded hydroxy groups and/or hydrolyzable silyl groups, (D) 0.1 to 40 parts by weight of a hydrolyzable organosilane compound having at least 3 silicon-bonded hydrolyzable groups in the molecule and/or a partial hydrolytic condensate thereof, (E) 0.001 to 20 parts by weight of a curing catalyst, and (F) 0.05 to 20 parts by weight of a silane coupling agent.

[11]

A dismantlable addition reaction-curable liquid silicone adhesive composition for use in the method of dismantling a bonded assembly according to any one of [1] to [8], the adhesive composition comprising the following components (A), (B), (G) to (I):

(A) 0.5 to 50% by weight based on the overall adhesive composition of particles capable of generating heat upon receipt of microwave, (B) 35 to 65% by weight based on the overall adhesive composition of a hydroxide compound having a decomposition temperature of 180 to 600° C., (G) 100 parts by weight of an alkenyl-containing organopolysiloxane having a silicon-bonded alkenyl group at the end of the molecular chain, (H) an organohydrogenpolysiloxane having at least 2 silicon-bonded hydrogen atoms in the molecule, in such an amount as to give 0.01 to 3 moles of silicon-bonded hydrogen atoms per mole of the silicon-bonded alkenyl group in component (G), and (I) a platinum group metal catalyst in such an amount as to give 0.01 to 1,000 ppm by weight of platinum group metal based on the total amount of components (G) and (H).

Advantageous Effects of Invention

In connection with a bonded assembly in which a plurality of, typically two, members of organic resin or metal are bonded with a cured product of a curable liquid silicone adhesive composition which exhibits adhesive and/or sealing properties from room temperature to a high temperature of about 150° C., the method of dismantling a bonded assembly according to the invention involves irradiating microwave to the bonded assembly so that the cured product loses adhesive and/or sealing properties. Then the members can be easily separated apart in a short time with a less energy consumption, that is, the bonded assembly can be dismantled. The members can be easily recycled. The curable liquid silicone adhesive composition used as the bonding layer of the bonded assembly is useful as an adhesive or sealant at a joint which must be heat resistant and recyclable.

As used herein, the "heat resistant temperature" of members to be dismantled refers to the upper limit of temperature at which the members are not thermally decomposed or softened when they are held at the temperature for 1 minute.

DESCRIPTION OF EMBODIMENTS

Now the invention is described in detail.

In connection with a bonded assembly wherein a plurality of members are bonded with a cured product obtained by curing a curable liquid silicone adhesive composition comprising particles capable of generating heat upon receipt of microwave and a hydroxide compound having a decomposition temperature of 180 to 600° C., the content of the particles being 0.5 to 50% by weight, the invention provides a method of dismantling the bonded assembly comprising the steps of irradiating microwave to the cured product and separating apart the plurality of members, especially members of organic resin and/or metal.

[Curable Liquid Silicone Adhesive Composition]

The curable liquid silicone adhesive composition used herein cures into a cured product which serves as a bonding layer for bonding a plurality of members, specifically members of organic resin and/or metal together. The curable liquid silicone adhesive composition is based on a polymer whose backbone consists of siloxane bonds and comprises (A) particles capable of generating heat upon receipt of microwave and (B) a hydroxide compound having a decomposition temperature of 180 to 600° C., the content of the particles (A) being 0.5 to 50% by weight. The preferred cure type is condensation or addition reaction cure type.

[Particles Capable of Generating Heat Upon Receipt of Microwave]

The particles (A) used herein are capable of generating heat upon receipt of microwave such that the hydroxide compound (specifically, metal hydroxide or metal oxide hydroxide) in the curable liquid silicone adhesive composition is decomposed. As a result of decomposition of the hydroxide compound, water is released whereby the adhesive composition is foamed to invite a lowering of adhesion strength. The bonded assembly can be easily dismantled in a short time with a less energy consumption.

For the purpose of imparting dismantlability, the particles have an ability to generate heat upon receipt of microwave. Although any particles having such an ability are preferable, those particles having a high relative dielectric constant are more preferable because they have a high absorptivity of microwave and efficiently generate heat in a short time. The relative dielectric constant is preferably 3 to 1,000, more preferably 5 to 800 at 3 GHz.

The particles capable of generating heat upon receipt of microwave are preferably of at least one inorganic material selected from the group consisting of carbon blacks such as acetylene black, furnace black, channel black, thermal black, and Ketjen black, iron oxides such as iron (II) oxide, iron (III) oxide, and tri-iron tetroxide, titanium oxide compounds such as titanium oxide (TiO), titanium dioxide ($TiO_2$) and dititanium trioxide ($Ti_2O_3$), ferrites such as spinel ferrite, magnetoplumbite ferrite, and garnet ferrite, and silicon carbide. Of these, acetylene black, titanium dioxide and silicon carbide are more preferred.

The particles capable of generating heat upon receipt of microwave are preferably of particulate shape having an average particle size of 0.05 to 100 μm, more preferably 0.1 to 80 μm. If the average particle size is less than 0.05 μm, the composition cannot be heavily loaded with such particles because of a viscosity buildup, failing to exert a satisfactory heat generating effect. If the average particle size exceeds 100 μm, sometimes rubber flexibility is lost. It is noted that the average particle size is determined as a cumulative weight average value D50 or median diameter using a particle size distribution measuring system based on the laser diffractometry.

The particles capable of generating heat upon receipt of microwave may be either untreated or treated (hydrophobic surface treatment) on their surface. In case of surface treatment, alumina, silica, stearic acid, silane coupling agents, and silicone compounds may be used as the treating agent. The surface treatment may be performed by any well-known methods. The amount of treating agent is preferably up to 10% by weight, typically 0.1 to 8% by weight, more preferably 0.5 to 6% by weight, though not limited thereto.

The particles capable of generating heat upon receipt of microwave may be of one type or a mixture of two or more types.

The content of the particles capable of generating heat upon receipt of microwave is 0.5 to 50% by weight, preferably 1 to 40% by weight, more preferably 3 to 30% by weight, even more preferably 5 to 20% by weight of the overall weight of the curable liquid silicone adhesive composition. If the content is less than 0.5% by weight, no sufficient heat generation is achievable. If the content exceeds 50% by weight, the composition builds up its viscosity to disturb mixing and dispensing upon application.

[Hydroxide Compound Having a Decomposition Temperature of 180 to 600° C.]

The hydroxide compound (B) having a decomposition temperature of 180 to 600° C. is typically a metal hydroxide or metal oxide hydroxide. Aluminum hydroxide having a decomposition temperature of around 180° C., magnesium hydroxide having a decomposition temperature of around 300° C., and aluminum oxide hydroxide (boehmite) having a decomposition temperature of around 500° C. are exemplary.

Since the hydroxide compound starts decomposition upon heating, releases water as it is decomposed, and thus has an extinguishing effect, it is conventionally used as a flame retardant. In the invention, water released as a result of decomposition is utilized such that bubbles are generated in the cured product of the curable liquid silicone adhesive composition to reduce the adhesion strength, enabling the bonded assembly to be easily dismantled in a short time.

As the hydroxide compound having a decomposition temperature of 180 to 600° C., particles having an average particle size of up to 50 μm, preferably 0.5 to 20 μm are used. If the average particle size exceeds 50 μm, the compound becomes less decomposable. It is noted that the average particle size is determined as a cumulative weight average value D50 or median diameter by means of a particle size distribution measuring system based on the laser diffractometry.

The hydroxide compound may be either untreated or treated (hydrophobic surface treatment) on its surface. In case of surface treatment, the treating agent may be selected from commonly used ones, for example, silane coupling agents and fatty acids. The surface treatment may be performed by any well-known methods. The amount of treating agent is preferably up to 3% by weight, typically 0.1 to 3% by weight, more preferably 0.2 to 2% by weight, though not limited thereto.

The hydroxide compound may be used alone while a mixture of two or more hydroxide compounds having different average particle size or undergoing different surface treatment may also be used.

The content of the hydroxide compound is 35 to 65% by weight, preferably 40 to 60% by weight, more preferably 45 to 55% by weight of the overall weight of the curable liquid silicone adhesive composition. If the content is less than 35% by weight, the decomposition (foaming) amount of hydroxide compound is insufficient to reduce the adhesion strength of the bonding layer. If the content exceeds 65% by weight, the composition builds up its viscosity to disturb mixing and dispensing upon application.

In the curable liquid silicone adhesive composition, the total content of the particles (A) capable of generating heat upon receipt of microwave and the hydroxide compound (B) is preferably 36 to 85% by weight, more preferably 40 to 75% by weight, even more preferably 45 to 65% by weight. The weight ratio of the particles (A) to the hydroxide compound (B) is preferably from 1:0.8 to 1:50, more preferably from 1:1 to 1:30, even more preferably from 1:2 to 1:20.

[Condensation-Curable Liquid Silicone Adhesive Composition]

The condensation-curable liquid silicone adhesive composition is defined as comprising, in addition to the particles (A) capable of generating heat upon receipt of microwave and the hydroxide compound (B) having a decomposition temperature of 180 to 600° C., (C) a linear diorganopolysiloxane which is blocked at both ends of the molecular chain with silicon-bonded hydroxy groups and/or hydrolyzable silyl groups (as base polymer), (D) a hydrolyzable organosilane compound having at least 3 silicon-bonded hydrolyzable groups in the molecule and/or a partial hydrolytic condensate thereof (as crosslinker), (E) a curing catalyst, and (F) a silane coupling agent (as tackifier) wherein a cured product is obtained by utilizing hydrolytic condensation reaction with the aid of airborne moisture or water at room temperature.

The organopolysiloxane serving as a base polymer or main component is a linear diorganopolysiloxane which is blocked at both ends of the molecular chain with silicon-bonded hydroxy groups (i.e., silanol groups) and/or hydrolyzable silyl groups. The hydrolyzable silyl group is preferably an alkoxysilyl group or alkoxy-substituted alkoxysilyl group.

When silicon-bonded hydroxy groups (i.e., silanol groups) are contained, preferably one silicon-bonded hydroxy group (i.e., hydroxysilyl or silanol group) is located at each end of the molecular chain.

When an alkoxysilyl group or alkoxy-substituted alkoxysilyl group is contained as the hydrolyzable silyl group, preferably 2 or 3 silicon-bonded alkoxy groups (i.e., alkoxysilyl groups) or silicon-bonded alkoxy-substituted alkoxy groups (i.e., alkoxyalkoxysilyl groups) are located at each end of the molecular chain, that is, there are present dialkoxyorganosilyl groups or bis(alkoxyalkoxy)organosilyl groups, or trialkoxysilyl groups or tris(alkoxyalkoxy)silyl groups.

The alkoxy group is preferably of 1 to 10 carbon atoms, more preferably 1 to 4 carbon atoms, and examples thereof include methoxy, ethoxy, propoxy, isopropoxy, butoxy, isobutoxy, tert-butoxy, hexyloxy, and octyloxy.

The alkoxy-substituted alkoxy group is preferably of 2 to 10 carbon atoms, more preferably 2 to 4 carbon atoms, and examples thereof include methoxyethoxy, ethoxyethoxy, and methoxypropoxy.

The linear diorganopolysiloxane which is blocked at both ends of the molecular chain with silicon-bonded hydroxy groups and/or hydrolyzable silyl groups is preferably a diorganopolysiloxane having hydroxy groups (silanol groups), methoxy groups or ethoxy groups at both ends, preferably only at both ends thereof.

The silicon-bonded organic groups other than the hydroxy group and hydrolyzable group are substituted or unsubstituted monovalent hydrocarbon groups of 1 to 18 carbon atoms, preferably 1 to 10 carbon atoms. Examples of the monovalent hydrocarbon group include alkyl groups such as methyl, ethyl, propyl, isopropyl, butyl, isobutyl, tert-butyl, hexyl, heptyl, octyl, and 2-ethylhexyl; cycloalkyl groups such as cyclopentyl and cyclohexyl; alkenyl groups such as vinyl and allyl; aryl groups such as phenyl, tolyl, and naphthyl; aralkyl groups such as benzyl, phenylethyl, and phenylpropyl; and substituted forms of the foregoing groups in which some or all of the carbon-bonded hydrogen atoms are substituted by halogen atoms (e.g., fluorine, bromine and chlorine) or cyano groups, typically halogenated monovalent hydrocarbon groups such as trifluoropropyl and chloropropyl, and cyanoalkyl groups such as β-cyanoethyl and γ-cyanopropyl.

The organopolysiloxane as the base polymer or main component should preferably have a viscosity at 23° C. of 50 to 1,000,000 mPa·s, more preferably 100 to 300,000 mPa·s. If the viscosity is below the lower limit, sometimes a cured product having satisfactory mechanical properties is not obtained. If the viscosity is beyond the upper limit, sometimes working efficiency is lowered. It is noted that the viscosity is measured at 23° C. by a rotational viscometer such as BL, BH, BS or cone plate type viscometer, or rheometer (the same holds true, hereinafter).

The organopolysiloxane as the base polymer or main component may be used alone or in admixture of two or more.

The hydrolyzable organosilane compound and/or partial hydrolytic condensate thereof as the crosslinking or curing agent (D) is a hydrolyzable organosilane compound having at least 3 silicon-bonded hydrolyzable groups in the molecule and/or a partial hydrolytic condensate thereof, i.e., a siloxane compound such as siloxane oligomer having at least 3 residual hydrolyzable groups in the molecule. The hydrolyzable organosilane compound functions as a crosslinking or curing agent in that at least 3 hydrolyzable groups in its molecule form a crosslinked structure through hydrolytic condensation reaction with the linear diorganopolysiloxane which is blocked at both ends of the molecular chain with silicon-bonded hydroxy groups and/or hydrolyzable silyl groups as the base polymer.

Examples of the hydrolyzable group in the hydrolyzable organosilane compound include alkoxy, alkoxy-substituted alkoxy, acyloxy, alkenoxy, ketoxime, aminoxy, and amide groups of 1 to 10 carbon atoms. Illustrative examples include alkoxy groups such as methoxy, ethoxy and propoxy; alkoxy-substituted alkoxy groups such as methoxyethoxy, ethoxyethoxy and methoxypropoxy; acyloxy groups such as acetoxy and octanoyloxy; alkenoxy groups such as vinyloxy, isopropenoxy and 1-ethyl-2-methylvinyloxy; ketoxime groups such as dimethylketoxime, methylethylketoxime and methylisobutylketoxime; aminoxy groups such as dimethylaminoxy and diethylaminoxy; and amide groups such as N-methylacetamide and N-ethylacetamide.

Besides the hydrolyzable group, the hydrolyzable organosilane compound may have a silicon-bonded organic group. The silicon-bonded organic groups other than the hydrolyzable group are typically substituted or unsubstituted monovalent hydrocarbon groups of 1 to 18 carbon atoms, preferably 1 to 10 carbon atoms. Examples thereof include alkyl groups such as methyl, ethyl, propyl, isopropyl, butyl, isobutyl, tert-butyl, hexyl, heptyl, octyl, 2-ethylhexyl, nonyl, decyl and octadecyl; cycloalkyl groups such as cyclopentyl and cyclohexyl; alkenyl groups such as vinyl and allyl; aryl groups such as phenyl, tolyl, xylyl and naphthyl; aralkyl groups such as benzyl, phenethyl, and phenylpropyl; and substituted forms of the foregoing groups in which some or all of the carbon-bonded hydrogen atoms are substituted by halogen atoms (e.g., fluorine, bromine and chlorine) or cyano groups, typically halogenated alkyl groups such as 3-chloropropyl and 3,3,3-trifluoropropyl. Of the substituted or unsubstituted monovalent hydrocarbon groups, methyl, ethyl, propyl, vinyl and phenylene are preferred.

Examples of the hydrolyzable organosilane compound and partial hydrolytic condensate thereof include alkoxysilanes such as methyltrimethoxysilane, ethyltrimethoxysilane, decyltrimethoxysilane, vinyltrimethoxysilane, phenyltrimethoxysilane, methyltriethoxysilane, ethyltriethoxysilane, vinyltriethoxysilane, phenyltriethoxysilane, tetramethoxysilane, and tetraethoxysilane; ketoximesilanes such as methyltris(dimethylketoxime)silane, methyltris(diethylketoxime)silane, ethyltris(methylethylketoxime)silane, methyltris(methylisobutylketoxime)silane, and vinyltris(methylethylketoxime)silane; alkoxy-substituted alkoxysilanes such as methyltri(methoxymethoxy)silane, ethyltri(methoxymethoxy)silane, vinyltri (methoxymethoxy)silane, phenyltri(methoxymethoxy) silane, methyltri(ethoxymethoxy)silane, ethyltri (ethoxymethoxy)silane, vinyltri(ethoxymethoxy)silane, phenyltri(ethoxymethoxy)silane, tetra(methoxymethoxy)silane, and tetra(ethoxymethoxy)silane; aminoxysilanes such as methyltris(N,N-diethylaminoxy)silane; amidosilanes such as methyltris(N-methylacetamido)silane, methyltris(N-butylacetamido)silane, and methyltris(N-cyclohexylacetamido)silane; alkenoxysilanes such as methyltriisopropenoxysilane, vinyltriisopropenoxysilane, and phenyltriisopropenoxysilane; acyloxysilanes such as methyltriacetoxysilane and vinyltriacetoxysilane as well as partial hydrolytic condensates of the foregoing hydrolyzable organosilane compounds.

The hydrolyzable organosilane compound serving as the crosslinking or curing agent is definitely distinguished from the silane coupling agent (F) serving as the tackifier, described later, in that it does not contain in its molecule a monovalent hydrocarbon group substituted with a functional group having a heteroatom such as nitrogen, oxygen or sulfur.

The hydrolyzable organosilane compound and/or partial hydrolytic condensate thereof may be used alone or in admixture.

The amount of the hydrolyzable organosilane compound and/or partial hydrolytic condensate thereof as the crosslinking or curing agent blended is 0.1 to 40 parts by weight, preferably 1 to 20 parts by weight per 100 parts by weight of the linear diorganopolysiloxane which is blocked at both ends of the molecular chain with silicon-bonded hydroxy groups and/or hydrolyzable silyl groups. If the amount of the hydrolyzable organosilane compound and/or partial hydrolytic condensate thereof is below the lower limit (0.1 part by weight), curability or storage stability may be degraded. If the amount exceeds the upper limit (40 parts by weight), such a large amount is uneconomical, and a cured product may lose elongation or durability.

The curing catalyst (E) may be selected from condensation catalysts commonly used in the prior art as the curing promoter for condensation-curable liquid silicone adhesive compositions (or room temperature-curable organopolysiloxane compositions). Examples include organotin compounds such as dibutyltin methoxide, dibutyltin diacetate, dibutyltin dioctate, dibutyltin dilaurate, dioctyltin dilaurate, dioctyltin dioctate, dioctyltin dineodecanoate, dimethyltin dimethoxide, and dimethyltin diacetate; organotitanium compounds such as tetrapropyl titanate, tetrabutyl titanate, tetra-2-ethylhexyl titanate, and dimethoxytitanium diacetylacetonate; amine compounds such as hexylamine and tetramethylguanidyl propyltrimethoxysilane, and salts thereof, which may be used alone or in admixture.

The amount of the curing catalyst blended is 0.001 to 20 parts by weight, preferably 0.005 to 5 parts by weight, more preferably 0.01 to 2 parts by weight per 100 parts by weight of the linear diorganopolysiloxane which is blocked at both ends of the molecular chain with silicon-bonded hydroxy groups and/or hydrolyzable silyl groups. If the amount of the curing catalyst blended is below the lower limit (0.001 part by weight), no catalytic effect may be exerted. If the amount of the curing catalyst exceeds the upper limit (20 parts by weight), such a large amount is uneconomical, and the composition may lose durability or adhesiveness.

To the condensation-curable liquid silicone adhesive composition, a silane coupling agent having the functions of enhancing adhesion strength and serving as a tackifying component is added as component (F). Notably, the silane coupling agent is a hydrolyzable silane compound having in its molecule a monovalent hydrocarbon group substituted with a functional group (exclusive of guanidyl) containing a heteroatom such as nitrogen, oxygen or sulfur, also known as a carbon functional silane compound.

The silane coupling agent as the tackifying component may be selected from well-known silane coupling agents commonly used in the art. Preferred are silane coupling agents having an alkoxy or alkenoxy group as the hydrolyzable group. Exemplary of the alkoxy group are methoxy, ethoxy and propoxy. Exemplary of the alkenoxy group are vinyloxy, isopropenoxy and 1-ethyl-2-methylvinyloxy.

Preferred as the monovalent hydrocarbon group substituted with a functional group (exclusive of guanidyl) containing a heteroatom such as nitrogen, oxygen or sulfur are monovalent hydrocarbon groups of 1 to 20 carbon atoms having at least one of substituted or unsubstituted amino groups, substituted or unsubstituted imino groups, mercapto groups, epoxy groups, and (meth)acryloxy groups. Examples thereof include γ-acryloxypropyl, γ-methacryloxypropyl, β-(3,4-epoxycyclohexyl)ethyl, γ-glycidoxypropyl, N-β-(aminoethyl)-γ-aminopropyl, γ-aminopropyl, γ-mercaptopropyl, and a group having the following formula.

[Chem. 1]

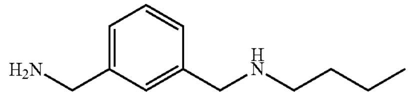

Besides the hydrolyzable group and the monovalent hydrocarbon group substituted with a functional group, the silane coupling agent may have a silicon-bonded organic group. Preferred as the silicon-bonded organic group other than the hydrolyzable group and the monovalent hydrocarbon group substituted with a functional group are monovalent hydrocarbon groups of 1 to 10 carbon atoms. Examples thereof include alkyl groups such as methyl, ethyl, propyl, isopropyl, butyl, isobutyl, tert-butyl, hexyl, heptyl and octyl; cycloalkyl groups such as cyclopentyl and cyclohexyl; alkenyl groups such as vinyl and allyl; aryl groups such as phenyl, tolyl and xylyl; and aralkyl groups such as benzyl and phenethyl. Inter alia, methyl and ethyl are preferred.

Examples of the silane coupling agent include γ-acryloxypropyltrimethoxysilane, γ-methacryloxypropyltrimethoxysilane, β-(3,4-epoxycyclohexyl)ethyltrimethoxysilane, γ-glycidoxypropyltrimethoxysilane, γ-glycidoxypropylmethyldiethoxysilane, N-β-(aminoethyl)-γ-aminopropyltrimethoxysilane, and γ-aminopropyltriethoxysilane, a silane compound of the following formula:

[Chem. 2]

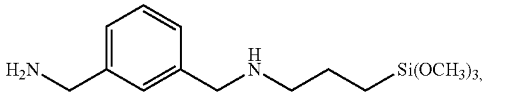

γ-mercaptopropyltrimethoxysilane, γ-glycidoxypropyltriisopropenoxysilane, and γ-glycidoxypropylmethyldiisopropenoxysilane. Inter alia, amino-containing silane coupling agents are preferred.

The silane coupling agent may be used alone or in admixture.

The amount of the silane coupling agent (F) blended is 0.05 to 20 parts by weight, preferably 0.1 to 15 parts by weight, more preferably 0.5 to 10 parts by weight per 100 parts by weight of the linear diorganopolysiloxane which is blocked at both ends of the molecular chain with silicon-bonded hydroxy groups and/or hydrolyzable silyl groups. If the amount is less than 0.05 part by weight, sufficient adhesiveness is not obtained. If the amount exceeds 20 parts by weight, the composition has poor weather resistance and mechanical properties.

In the condensation-curable liquid silicone adhesive composition, an optional component may be blended besides the foregoing components as long as the benefits of the invention are not impaired. Suitable optional components include inorganic fillers other than components (A) and (B), pigments, dyes, coloring agents like fluorescent brighteners, antibacterial agents, mildew-proofing agents, and plasticizers such as silicone oil (non-functional organopolysiloxane).

Typical of the inorganic fillers other than components (A) and (B) are fine powdery inorganic fillers (excluding components (A) and (B)) including dry silica (e.g., fumed silica), wet silica (e.g., precipitated silica), quartz powder, diatomaceous earth powder, microparticulate alumina, magnesia powder, and such powders which are surface-treated with silanes, silazanes, and polysiloxanes having a low degree of polymerization. When used, the amount of the inorganic filler blended is preferably 0.1 to 800 parts by weight, more preferably 0.5 to 600 parts by weight per 100 parts by weight of the linear diorganopolysiloxane which is blocked at both ends of the molecular chain with silicon-bonded hydroxy groups and/or hydrolyzable silyl groups.

The condensation-curable liquid silicone adhesive composition may be prepared by uniformly mixing the aforementioned components on a well-known mixer in a moisture-proof state (in dry atmosphere or under reduced pressure) according to the standard procedure.

The condensation-curable liquid silicone adhesive composition cures as it is allowed to stand at room temperature (23° C.±15° C.). With respect to the molding method and curing conditions, any of well-known methods and conditions may be chosen depending on the type of condensation-curable liquid silicone adhesive composition. For example, the composition cures as it is allowed to stand in air under conditions of 23° C. and RH 50% for several hours to several days (e.g., 6 hours to 7 days).

[Addition Reaction-Curable Liquid Silicone Adhesive Composition]

The addition reaction-curable liquid silicone adhesive composition is defined as comprising, in addition to the particles (A) capable of generating heat upon receipt of microwave and the hydroxide compound (B) having a decomposition temperature of 180 to 600° C., (G) a linear diorganopolysiloxane blocked at the end of the molecular chain with a silyl group having a silicon-bonded alkenyl group, typically vinyl (as base polymer), (H) an organohydrogenpolysiloxane having at least 2 silicon-bonded hydrogen atoms (i.e., SiH groups) in the molecule (as crosslinker), and (I) a platinum group metal catalyst (as hydrosilation addition reaction catalyst) wherein addition reaction (hydrosilation reaction) of SiH groups with vinyl groups takes place to induce crosslinking, yielding a cured product.

The alkenyl-containing organopolysiloxane (G) as the base polymer or main component is a linear diorganopolysiloxane which is blocked at the end of the molecular chain (one end or both ends of the molecular chain) with a silyl group having a silicon-bonded alkenyl group, typically vinyl. It is an organopolysiloxane having on the average at least 1, preferably at least 2, typically about 2 to 20, more preferably about 2 to 10, even more preferably about 2 to 5 silicon-bonded alkenyl groups in the molecule. Exemplary alkenyl groups are lower alkenyl groups of about 2 to 6 carbon atoms, preferably about 2 to 4 carbon atoms, such as vinyl, allyl, propenyl, isopropenyl, butenyl, hexenyl, and cyclohexenyl. It is noted that the alkenyl-containing organopolysiloxane as the base polymer or main component may have alkenyl groups on molecular side chains as long as it has a silicon-bonded alkenyl group at one end or both ends of the molecular chain.

The silicon-bonded organic group other than the silicon-bonded alkenyl group is not particularly limited as long as it is free of aliphatic unsaturation. Typical organic groups are substituted or unsubstituted monovalent hydrocarbon groups of 1 to 12 carbon atoms, preferably 1 to 10 carbon atoms which are free of aliphatic unsaturation. Examples of the substituted or unsubstituted monovalent hydrocarbon group include alkyl groups such as methyl, ethyl, propyl, butyl, pentyl, hexyl, and heptyl; cycloalkyl groups such as cyclohexyl; aryl groups such as phenyl, tolyl, xylyl and naphthyl, aralkyl groups such as benzyl and phenethyl; and substituted forms of the foregoing groups in which some or all of the hydrogen atoms are substituted by halogen atoms (e.g., fluorine, bromine and chlorine), typically halogenated alkyl groups such as chloromethyl, 3-chloropropyl and 3,3,3-trifluoropropyl. Inter alia, alkyl and aryl groups are preferred, with methyl and phenyl being more preferred.

Examples of the alkenyl-containing organopolysiloxane include both end dimethylvinylsiloxy-blocked dimethylpolysiloxane, both end dimethylvinylsiloxy-blocked dimethylsiloxane/methylvinylsiloxane copolymers, both end dimethylvinylsiloxy-blocked dimethylsiloxane/diphenylsiloxane copolymers, both end dimethylvinylsiloxy-blocked dimethylsiloxane/methylvinylsiloxane/diphenylsiloxane copolymers, both end dimethylvinylsiloxy-blocked methyltrifluoropropylpolysiloxane, both end dimethylvinylsiloxy-blocked dimethylsiloxane/methyltrifluoropropylsiloxane copolymers, both end dimethylvinylsiloxy-blocked dimethylsiloxane/methyltrifluoropropylsiloxane/methylvinylsiloxane copolymers, both end methyldivinylsiloxy-blocked dimethylpolysiloxane, both end methyldivinylsiloxy-blocked dimethylsiloxane/methylvinylsiloxane copolymers, both end methyldivinylsiloxy-blocked dimethylsiloxane/diphenylsiloxane copolymers, both end methyldivinylsiloxy-blocked dimethylsiloxane/methylvinylsiloxane/diphenylsiloxane copolymers, both end methyldivinylsiloxy-blocked methyltrifluoropropylpolysiloxane, both end methyldivinylsiloxy-blocked dimethylsiloxane/methyltrifluoropropylsiloxane copolymers, both end methyldivinylsiloxy-blocked dimethylsiloxane/methyltrifluoropropylsiloxane/methylvinylsiloxane copolymers, both end trivinylsiloxy-blocked dimethylpolysiloxane, both end trivinylsiloxy-blocked dimethylsiloxane/methylvinylsiloxane copolymers, both end trivinylsiloxy-blocked dimethylsiloxane/diphenylsiloxane copolymers, both end trivinylsiloxy-blocked dimethylsiloxane/methylvinylsiloxane/diphenylsiloxane copolymers, both end trivinylsiloxy-blocked methyltrifluoropropylpolysiloxane, both end trivinylsiloxy-blocked dimethylsiloxane/methyltrifluoropropylsiloxane copolymers, both end trivinylsiloxy-blocked dimethylsiloxane/methyltrifluoropropylsiloxane/methylvinylsiloxane copolymers, dimethylpolysiloxane blocked with trimethylsiloxy at one end and with dimethylvinylsiloxy at the other end, dimethylsiloxane/methylvinylsiloxane copolymers blocked with trimethylsiloxy at one end and with dimethylvinylsiloxy at the other end, dimethylsiloxane/diphenylsiloxane copolymers blocked with trimethylsiloxy at one end and with dimethylvinylsiloxy at the other end, dimethylsiloxane/methylvinylsiloxane/diphenylsiloxane copolymers blocked with trimethylsiloxy at one end and with dimethylvinylsiloxy at the other end, methyltrifluoropropylpolysiloxane blocked with trimethylsiloxy at one end and with dimethylvinylsiloxy at the other end, dimethylsiloxane/methyltrifluoropropylsiloxane copolymers blocked with trimethylsiloxy at one end and with dimethylvinylsiloxy at the other end, and dimethylsiloxane/methyltrifluoropropylsiloxane/methylvinylsiloxane copolymers blocked with trimethylsiloxy at one end and with dimethylvinylsiloxy at the other end.

The alkenyl-containing organopolysiloxane as the base polymer or main component should preferably have a viscosity at 23° C. of 100 to 500,000 mPa's, more preferably 700 to 100,000 mPa·s.

The alkenyl-containing organopolysiloxane as the base polymer or main component may be used alone or in admixture.

The organohydrogenpolysiloxane (H) serving as the crosslinking or curing agent has on the average at least 2, preferably at least 3, and preferably up to 500, more preferably up to 200, even more preferably up to 100 silicon-bonded hydrogen atoms (i.e., SiH groups) in the molecule, and is preferably free of aliphatic unsaturation in the molecule.

Besides the silicon-bonded hydrogen atoms, the organohydrogenpolysiloxane has a silicon-bonded organic group, which is typically a substituted or unsubstituted monovalent hydrocarbon group of 1 to 10 carbon atoms, preferably 1 to 6 carbon atoms, though not limited thereto. Examples of the monovalent hydrocarbon group include those exemplified above as the silicon-bonded organic group other than the silicon-bonded alkenyl group in the description of the alkenyl-containing organopolysiloxane and alkenyl groups such as vinyl and allyl. Inter alia, the unsubstituted monovalent hydrocarbon groups free of aliphatic unsaturation such as alkyl and aryl groups are preferred, with methyl and phenyl being more preferred.

As the organohydrogenpolysiloxane, those having 2 to 300, preferably 3 to 150, more preferably 4 to 100 silicon atoms per molecule which are liquid at room temperature are preferred. The silicon-bonded hydrogen atom may be positioned at the end or an intermediate (non-end) of the molecular chain or both. The molecular structure of the organohydrogenpolysiloxane may be linear, cyclic, branched or three-dimensional network. Herein, the degree of polymerization, which is the number of repeating diorganosiloxane units constituting the backbone or an index of the number of silicon atoms in the molecule, can be determined as a number average degree of polymerization or number average molecular weight by gel permeation chromatography (GPC) analysis versus polystyrene standards using toluene or the like as the developing solvent.

Examples of the organohydrogenpolysiloxane include 1,1,3,3-tetramethyldisiloxane, 1,3,5,7-tetramethylcyclotetrasiloxane, tris(hydrogendimethylsiloxy)methylsilane, tris(hydrogendimethylsiloxy)phenylsilane, methylhydrogencyclopolysiloxane, methylhydrogensiloxane/dimethylsiloxane cyclic copolymers, both end trimethylsiloxy-blocked methylhydrogenpolysiloxane, both end trimethylsiloxy-blocked dimethylsiloxane/methylhydrogensiloxane copolymers, both end dimethylhydrogensiloxy-blocked dimethylpolysiloxane, both end dimethylhydrogensiloxy-blocked dimethylsiloxane/methylhydrogensiloxane copolymers, both end trimethylsiloxy-blocked methylhydrogensiloxane/diphenylsiloxane copolymers, both end trimethylsiloxy-blocked methylhydrogensiloxane/diphenylsiloxane/dimethylsiloxane copolymers, both end trimethylsiloxy-blocked methylhydrogensiloxane/methylphenylsiloxane/dimethylsiloxane copolymers, both end dimethylhydrogensiloxy-blocked methylhydrogensiloxane/dimethylsiloxane/diphenylsiloxane copolymers, both end dimethylhydrogensiloxy-blocked methylhydrogensiloxane/dimethylsiloxane/methylphenylsiloxane copolymers, copolymers consisting of $(CH_3)_2HSiO_{1/2}$ units, $(CH_3)_3SiO_{1/2}$ units and $SiO_{4/2}$ units, copolymers consisting of $(CH_3)_2HSiO_{1/2}$ units and $SiO_{4/2}$ units, copolymers consisting of $(CH_3)_2HSiO_{1/2}$ units, $SiO_{4/2}$ units, and $(C_6H_5)$ $SiO_{3/2}$ units, and substituted forms of the foregoing in which some or all methyl groups are substituted by other alkyl groups or phenyl groups.

The organohydrogenpolysiloxane may be used alone or in admixture.

The organohydrogenpolysiloxane is added in such an amount as to give 0.01 to 3 moles, preferably 0.05 to 2.5 moles, more preferably 0.2 to 2 moles of silicon-bonded hydrogen atoms (or SiH groups) per mole of silicon-bonded alkenyl groups in the alkenyl-containing organopolysiloxane.

The platinum group metal catalyst or hydrosilation addition reaction catalyst (I) is used to promote addition reaction of silicon-bonded alkenyl groups in the alkenyl-containing organopolysiloxane with silicon-bonded hydrogen atoms in the organohydrogenpolysiloxane. It may be any of well-known catalysts. Examples of the catalyst include platinum based catalysts such as platinum black, chloroplatinic acid, alcohol-modified chloroplatinic acids, complexes of chloroplatinic acid with olefins, aldehydes, vinylsiloxanes or acetylene alcohols.

The platinum group metal catalyst is used in a catalytic amount, which may be adjusted in accordance with the desired cure speed. Specifically, the amount is 0.1 to 1,000 ppm, preferably 1 to 300 ppm by weight as platinum group metal based on the total amount of the alkenyl-containing organopolysiloxane and the organohydrogenpolysiloxane. Too much amounts may cause the cured product to lose heat resistance.

To the addition reaction-curable liquid silicone adhesive composition, a silane coupling agent having the functions of enhancing adhesion strength and serving as a tackifying component is preferably added as component (J). The silane coupling agent is a hydrolyzable silane compound having in its molecule a monovalent hydrocarbon group substituted with a functional group containing a heteroatom such as oxygen or sulfur, also known as a carbon functional silane compound.

The silane coupling agent as the tackifying component may be selected from well-known silane coupling agents commonly used in the art. Specifically, those exemplified above as the silane coupling agent (F) are suitable.

When used, the amount of the silane coupling agent blended is preferably 0.05 to 20 parts by weight, more preferably 0.1 to 15 parts by weight, even more preferably 0.5 to 10 parts by weight per 100 parts by weight of the alkenyl-containing organopolysiloxane as the base polymer. If the amount is less than 0.05 part by weight, sometimes sufficient adhesiveness is not obtained. If the amount exceeds 20 parts by weight, sometimes the composition has poor weather resistance and mechanical properties.

In the addition reaction-curable liquid silicone adhesive composition, an optional component may be blended besides the foregoing components as long as the benefits of the invention are not impaired. Suitable optional components include reaction inhibitors, inorganic fillers as exemplified above in conjunction with the condensation-curable liquid silicone adhesive composition, exclusive of (A) the particles capable of generating heat upon receipt of microwave and (B) the hydroxide compound having a decomposition temperature of 180 to 600° C., organopolysiloxanes containing neither a silicon-bonded hydrogen atom (SiH group) nor a silicon-bonded alkenyl group (i.e., so-called non-functional silicone oil), heat resistant additives, flame retardants, thixotropic agents, pigments, and dyes.

The addition reaction-curable liquid silicone adhesive composition may be prepared by uniformly mixing the aforementioned components on a well-known mixer according to the standard procedure.

The conditions under which the addition reaction-curable liquid silicone adhesive composition is cured include a temperature of 23 to 150° C., especially 23 to 100° C. and a time of 10 minutes to 8 hours, especially 30 minutes to 5 hours.

[Bonded Assembly]

In the method of dismantling a bonded assembly, the bonded assembly is such that a plurality of, typically two, identical or different members are bonded with a cured product (i.e., bonding layer of adhesive cured silicone rubber) obtained by curing a curable liquid silicone adhesive composition comprising particles capable of generating heat upon receipt of microwave and a hydroxide compound having a decomposition temperature of 180 to 600° C. In the bonded assembly, the members bonded together are preferably identical or different members selected from organic resin members and metal members. Also preferably, at least one of the plurality of members bonded, typically one member is an organic resin member. Suitable combinations of members include a combination of members of identical or different organic resins and a combination of a metal member with an organic resin member. Examples of the organic resin of which the organic resin member is made include polybutylene terephthalate (PBT) resins, polyphenylene sulfide (PPS) resins, polyamide resins such as nylon 66 (PA66) and nylon 6 (PA6), and polycarbonate (PC) resins. Examples of the metal of which the metal member is made include aluminum, iron, stainless steel (SUS), and copper. The organic resin or metal of which the organic resin or metal member is made should desirably have a heat resistant temperature of at least 160° C.

[Method of Preparing Bonded Assembly]

The curable liquid silicone adhesive composition comprising particles capable of generating heat upon receipt of microwave and a hydroxide compound having a decomposition temperature of 180 to 600° C. is applied to the surface of an organic resin or metal member in conformity to the shape of a joint (e.g., gasket) manually or through a mechanical dispenser. The member having the adhesive applied is attached and bonded to another organic resin or metal member, followed by curing. Thereafter, the members are fixedly secured by bolts or the like. In the embodiment wherein the curable liquid silicone adhesive composition is a condensation-curable liquid silicone adhesive composition, which cures at room temperature with airborne moisture, the plural members as joined together are allowed to stand, during which cure takes place. If it is desired to accelerate cure, humidification is effective. In the other embodiment wherein the curable liquid silicone adhesive composition is an addition reaction-curable liquid silicone adhesive composition, which cures through addition reaction at a temperature of 23 to 150° C., the plural members as joined together are allowed to stand or heated, during which cure takes place.

Examples of the bonded assembly include automobile components such as engines, transmissions, ECU and PCU, and electric/electronic components such as smartphones, tablets, liquid crystal displays, and batteries. The automobile components and electric/electronic components are preferred.

The bonded assembly maintains the bonded state at a service environment temperature below 150° C., preferably room temperature to 120° C.

The bonded assembly is preferably dismantlable in such a sense that the members are bonded at a certain adhesion strength during normal service, but after heating, the adhesion strength lowers to a level at which the members can be separated apart. Specifically, the bonded assembly has an initial shear adhesion strength of at least 1.2 MPa, more preferably at least 1.5 MPa and a shear adhesion strength of up to 1 MPa after irradiation of microwave. As used herein, the shear adhesion strength is measured according to the method of JIS K6850. In order that the shear adhesion strength at the initial and after heating fall in the ranges, the curable liquid silicone adhesive composition is formulated to the above-specified range.

[Dismantling Method]

The method of dismantling a bonded assembly according to the invention involves the steps of irradiating microwave to the cured product obtained by curing a curable liquid silicone adhesive composition (adhesive cured silicone rubber), cooling to room temperature, and allowing the plurality (typically two) of members of organic resin or metal to spontaneously separate apart or separating the plurality of members apart by manually applying a force or by means of a scraper or similar tool. In this way, the bonded assembly is dismantled. The dismantled members can then be recycled.

It is presumed that the cured product of the curable liquid silicone adhesive composition used in the dismantling method of the invention raises the following phenomenon upon irradiation of microwave.

(1) Irradiation of microwave cause the particles as component (A) to generate heat.

(2) By heat generation of the particles (A), the hydroxide compound as component (B) is heated. Then the hydroxide compound is decomposed to release water.

(3) As the released water is heated by heat generation of the particles (A) and irradiation of microwave, the water is gasified to create bubbles.

(4) The bubble formation in the cured product reduces the adhesion strength of the bonded assembly.

The microwave to be irradiated preferably has such a frequency, power and time that after irradiation, the adhesion strength is lowered to the level below which members can be separated. The frequency is selected in a range from 300 MHz to 300 GHz. The power is selected in a range from 300 W to 5,000 W. The microwave irradiation time is up to 30 minutes, preferably up to 15 minutes, more preferably up to 5 minutes, though not particularly limited.

EXAMPLES

Composition Examples, Composition Comparative Examples, Examples, and Comparative Examples are shown below for further illustrating the invention although the invention is not limited thereto. It is noted that room temperature is 23° C.; the viscosity is measured at 23° C. by a rotational viscometer; the average particle size is measured as a cumulative weight average value D50 or median diameter by means of a particle size distribution measuring system based on the laser diffractometry; and the relative dielectric constant is measured at 3 GHZ.

Preparation of Curable Liquid Silicone Adhesive Composition

Composition Example 1

Composition 1 was prepared by uniformly mixing 100 parts by weight of a dimethylpolysiloxane blocked at both ends of the molecular chain with trimethoxysilyl groups and having a viscosity of 30,000 mPa·s, 12 parts by weight (content based on the overall composition: 5.1 wt %) of surface-untreated acetylene black powder (relative dielectric constant 37) having an average particle size of 8 μm, 120 parts by weight (content based on the overall composition: 50.6 wt %) of surface-untreated aluminum hydroxide having an average particle size of 10 μm, 4 parts by weight of vinyltrimethoxysilane, 0.5 part by weight of γ-aminopropyltriethoxysilane, 0.5 part by weight of a compound having the following formula (1) obtained from dehydrochlorination reaction of xylylene diamine with 3-chloropropyltrimethoxysilane, and 0.1 part by weight of dioctyltin dineodecanoate.

Composition Example 2

Composition 2 was prepared by uniformly mixing 100 parts by weight of a dimethylpolysiloxane blocked at both ends of the molecular chain with hydroxy groups and having a viscosity of 20,000 mPa s, 12 parts by weight (content based on the overall composition: 5.0 wt %) of surface-untreated acetylene black powder (relative dielectric constant 37) having an average particle size of 8 μm, 120 parts by weight (content based on the overall composition: 50.2 wt %) of surface-untreated magnesium hydroxide having an average particle size of 1 μm, 6 parts by weight of vinyltrimethoxysilane, 0.5 part by weight of γ-aminopropyltriethoxysilane, 0.5 part by weight of the compound having formula (1) obtained from dehydrochlorination reaction of xylylene diamine with 3-chloropropyltrimethoxysilane, and 0.1 part by weight of dioctyltin dincodecanoate.

Composition Example 3

Composition 3 was prepared by uniformly mixing 100 parts by weight of dimethylpolysiloxane blocked at both ends of the molecular chain with hydroxy groups and having a viscosity of 20,000 mPa's, 20 parts by weight (content based on the overall composition: 8.1 wt %) of titanium dioxide (relative dielectric constant 96) which is surface-treated with alumina and silica (surface treatment amount 5 wt %) and has an average particle size of 0.3 μm, 120 parts by weight (content based on the overall composition: 48.6 wt %) of surface-untreated aluminum hydroxide having an average particle size of 10 μm, 5 parts by weight of phenyltriisopropenoxysilane, 0.5 part by weight of γ-aminopropyltriethoxysilane, 0.5 part by weight of the compound having formula (1) obtained from dehydrochlorination reaction of xylylene diamine with 3-chloropropyltrimethoxysilane, and 0.7 part by weight of tetramethylguanidyl propyltrimethoxysilane.

[Chem. 3]

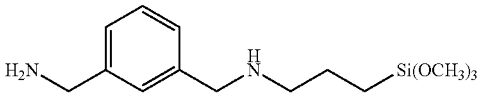

(1)

Composition Comparative Example 1

Composition 4 was prepared by uniformly mixing 100 parts by weight of the dimethylpolysiloxane blocked at both ends of the molecular chain with trimethoxysilyl groups and having a viscosity of 30,000 mPa's, 12 parts by weight of fumed silica, 4 parts by weight of vinyltrimethoxysilane, 0.5 part by weight of γ-aminopropyltriethoxysilane, 0.5 part by weight of the compound having formula (1) obtained from dehydrochlorination reaction of xylylene diamine with 3-chloropropyltrimethoxysilane, and 0.1 part by weight of dioctyltin dineodecanoate.

Composition Comparative Example 2

Composition 5 was prepared by uniformly mixing 100 parts by weight of the dimethylpolysiloxane blocked at both ends of the molecular chain with trimethoxysilyl groups and having a viscosity of 30,000 mPa's, 120 parts by weight (content based on the overall composition: 52.2 wt %) of surface-untreated aluminum hydroxide having an average particle size of 10 μm, 5 parts by weight of fumed silica, 4 parts by weight of vinyltrimethoxysilane, 0.5 part by weight of γ-aminopropyltriethoxysilane, 0.5 part by weight of the compound having formula (1) obtained from dehydrochlorination reaction of xylylene diamine with 3-chloropropyltrimethoxysilane, and 0.1 part by weight of dioctyltin dineodecanoate.

Composition Comparative Example 3

Composition 6 was prepared by uniformly mixing 100 parts by weight of the dimethylpolysiloxane blocked at both ends of the molecular chain with trimethoxysilyl groups and having a viscosity of 30,000 mPa·s, 0.3 part by weight (content based on the overall composition: 0.1 wt %) of surface-untreated acetylene black powder (relative dielectric constant 37) having an average particle size of 8 μm, 120 parts by weight (content based on the overall composition: 53.2 wt %) of surface-untreated aluminum hydroxide having an average particle size of 10 μm, 4 parts by weight of vinyltrimethoxysilane, 0.5 part by weight of γ-aminopropyltriethoxysilane, 0.5 part by weight of the compound having formula (1) obtained from dehydrochlorination reaction of xylylene diamine with 3-chloropropyltrimethoxysilane, and 0.1 part by weight of dioctyltin dineodecanoate.

[Preparation of Bonded Assembly]

There were furnished two substrates of 25 mm wide and 100 mm long made of polybutylene terephthalate (PBT) resin having a heat resistant temperature of at least 150° C. Using any one of Compositions 1 to 6 as the curable liquid silicone adhesive, two PBT substrates were joined together through an adhesive layer having a thickness of 0.5 mm and a bonding area of 2.5 $cm^2$. After aging at 23° C. and RH 50% for 7 days, a bonded assembly was obtained in which two PBT substrates were bonded together through the cured product of the curable liquid silicone adhesive (adhesive cured silicone rubber).

Evaluation of Dismantling

Examples 1 to 3 and Comparative Examples 1 to 3

On the bonded assemblies prepared above, their adhesion strength (ease of dismantling) was evaluated by the following test, with the results shown in Table 1.

(1) Adhesion Strength (Initial)

The bonded assembly was measured for initial shear adhesion strength according to the method of JIS K6850.

(2) Adhesion Strength (After Microwave Irradiation)

The bonded assembly was irradiated with microwave at frequency 2.4 GHz and power 1,000 W for the time shown in Table 1 and cooled to room temperature, after which the shear adhesion strength to the PBT member of the adhesive cured silicone rubber after microwave irradiation was measured by the same method as in (1). The composition is regarded "peeled" when the members separated apart after microwave irradiation and before shear adhesion strength measurement.

TABLE 1

| | | Example | | | Comparative Example | | |
|---|---|---|---|---|---|---|---|
| | | 1 | 2 | 3 | 1 | 2 | 3 |
| Composition | | 1 | 2 | 3 | 4 | 5 | 6 |
| Microwave irradiation time (sec) | | 120 | 180 | 90 | 180 | 180 | 180 |
| Adhesion strength | Initial | 2.2 | 2.4 | 2.4 | 1.3 | 1.8 | 1.5 |
| (MPa) | After microwave irradiation | peeled | 0.6 | peeled | 1.3 | 1.7 | 1.3 |

As seen from the above results, the cured product of the curable liquid silicone adhesive composition used in the method of dismantling a bonded assembly according to the invention reduces its adhesion strength upon receipt of microwave as a result of the hydroxide compound being decomposed. Then the resin members bonded with the cured product of the curable liquid silicone adhesive composition (i.e., adhesive cured silicone rubber) can be easily dismantled in a short time of 90 to 180 seconds with less energy consumption.

In contrast, the bonded assemblies of Comparative Examples 1 and 2 are not dismantlable upon receipt of microwave because no heat generating particles are contained. That is, the adhesive cured silicone rubber (i.e., bonding layer) showed little or no changes of adhesion strength upon receipt of microwave and maintained heat resistance or adhesion. Thus the bonded assembly could not be dismantled.

The bonded assembly of Comparative Example 3 is not dismantlable because particles capable of generating heat upon receipt of microwave are contained, but in a small amount below the specific value, leading to an insufficient heat generating effect and a less reduction of adhesion strength.

The invention claimed is:

1. A method of dismantling a bonded assembly wherein a plurality of members are bonded with a cured product obtained by curing a curable liquid silicone adhesive composition comprising particles capable of generating heat upon receipt of microwave energy and a hydroxide compound having a decomposition temperature of 180 to 600° C., the content of the particles being 0.5 to 50% by weight, the method comprising the steps of:

irradiating the microwave energy to the cured product at room temperature; and separating the plurality of members apart.

2. The method of dismantling a bonded assembly according to claim 1 wherein the curable liquid silicone adhesive composition is a condensation-curable liquid silicone adhesive composition or addition reaction-curable liquid silicone adhesive composition.

3. The method of dismantling a bonded assembly according to claim 1 wherein the particles capable of generating heat upon receipt of the microwave energy are particles of at least one compound selected from carbon, iron oxide, titanium oxide, ferrite and silicon carbide.

4. The method of dismantling a bonded assembly according to claim 1 wherein the hydroxide compound having a decomposition temperature of 180 to 600° C. is at least one compound selected from aluminum hydroxide, magnesium hydroxide, and aluminum oxide hydroxide (boehmite).

5. The method of dismantling a bonded assembly according to claim 1 wherein the microwave energy has a frequency of 300 MHz to 300 GHz.

6. The method of dismantling a bonded assembly according to claim 1 wherein the content of the hydroxide compound having a decomposition temperature of 180 to 600° C. is 35 to 65% by weight of the overall curable liquid silicone adhesive composition.

7. The method of dismantling a bonded assembly according to claim 1, further comprising a step of peeling the cured product of a curable liquid silicone adhesive composition from the plurality of members manually or by means of a scraper.

8. The method of dismantling a bonded assembly according to claim 1 wherein the bonded assembly is an automobile component or electric/electronic component.

9. A bonded assembly for use in the method of dismantling a bonded assembly according to claim 1.

10. The method of dismantling a bonded assembly according to claim 1 wherein at least one of the plurality of members bonded is an organic resin member.

11. The method of dismantling a bonded assembly according to claim 10 wherein the organic resin member comprises at least of one of a polybutylene terephthalate (PBT) resin, a polyphenylene sulfide (PPS) resin, a polyamide resin, and a polycarbonate (PC) resin.

12. The method of dismantling a bonded assembly according to claim 1 wherein the particles comprise particles of titanium oxide or silicon carbide.

13. A dismantlable condensation-curable liquid silicone adhesive composition for use in the method of dismantling a bonded assembly according to claim 1, the adhesive composition comprising the following components (A) to (F):

(A) 0.5 to 50% by weight based on the overall adhesive composition of particles capable of generating heat upon receipt of microwave energy, (B) 35 to 65% by weight based on the overall adhesive composition of a hydroxide compound having a decomposition temperature of 180 to 600° C., (C) 100 parts by weight of a linear diorganopolysiloxane which is blocked at both ends of the molecular chain with silicon-bonded hydroxy groups and/or hydrolyzable silyl groups, (D) 0.1 to 40 parts by weight of a hydrolyzable organosilane compound having at least 3 silicon-bonded hydrolyzable groups in the molecule and/or a partial hydrolytic condensate thereof, (E) 0.001 to 20 parts by weight of a curing catalyst, and (F) 0.05 to 20 parts by weight of a silane coupling agent.

14. A dismantlable addition reaction-curable liquid silicone adhesive composition for use in the method of dismantling a bonded assembly according to claim 1, the adhesive composition comprising the following components (A), (B), (G) to (I):

(A) 0.5 to 50% by weight based on the overall adhesive composition of particles capable of generating heat upon receipt of microwave energy, (B) 35 to 65% by weight based on the overall adhesive composition of a hydroxide compound having a decomposition temperature of 180 to 600° C., (G) 100 parts by weight of an alkenyl-containing organopolysiloxane having a silicon-bonded alkenyl group at the end of the molecular chain, (H) an organohydrogenpolysiloxane having at least 2 silicon-bonded hydrogen atoms in the molecule, in such an amount as to give 0.01 to 3 moles of silicon-bonded hydrogen atoms per mole of the silicon-bonded alkenyl group in component (G), and (I) a platinum group metal catalyst in such an amount as to give 0.01 to 1,000 ppm by weight of platinum group metal based on the total amount of components (G) and (H).

* * * * *